US011584261B2

(12) United States Patent
Teer et al.

(10) Patent No.: US 11,584,261 B2
(45) Date of Patent: Feb. 21, 2023

(54) POWER SEAT TRACK ASSEMBLY

(71) Applicant: FISHER & COMPANY, INCORPORATED, St. Clair Shores, MI (US)

(72) Inventors: Antal Teer, Harrison Township, MI (US); Burckhard Becker, Solingen (DE); Sapan M. Poptani, Northville, MI (US)

( * ) Notice: Subject to any disclaimer, the term of this patent is extended or adjusted under 35 U.S.C. 154(b) by 422 days.

(21) Appl. No.: 16/737,991

(22) Filed: Jan. 9, 2020

(65) Prior Publication Data

US 2020/0215936 A1 Jul. 9, 2020

Related U.S. Application Data

(60) Provisional application No. 62/790,245, filed on Jan. 9, 2019.

(51) Int. Cl.
*B60N 2/02* (2006.01)
*B60N 2/07* (2006.01)
(Continued)

(52) U.S. Cl.
CPC ......... *B60N 2/0232* (2013.01); *B60N 2/0707* (2013.01); *F16H 19/043* (2013.01); *B60N 2/067* (2013.01); *B60N 2002/0236* (2013.01)

(58) Field of Classification Search
CPC .... B60N 2/0232; B60N 2/0707; B60N 2/067; B60N 2002/0236
See application file for complete search history.

(56) References Cited

U.S. PATENT DOCUMENTS 546,249 A 9/1895 Regan
657,542 A 9/1900 Ingersoll
(Continued)

FOREIGN PATENT DOCUMENTS

CN 87101620 A 9/1988
CN 1109566 A 10/1995
(Continued)

OTHER PUBLICATIONS

Office Action regarding German Patent Application No. 102017100934.5, dated Jan. 27, 2021. Translation provided by Witte, Weller & Partner Patentanwälte mbB.
(Continued)

*Primary Examiner* — David R Dunn
*Assistant Examiner* — Tania Abraham
(74) *Attorney, Agent, or Firm* — Harness, Dickey & Pierce, P.L.C.

(57) ABSTRACT

A power seat track assembly may include an elongated first rail, a second rail, a motor assembly, and a power-transfer assembly. The second rail may engage the first rail and may be movable along a length of the first rail. The motor assembly may be mounted to the second rail and may be operable to drive the second rail along the length of the first rail. The power-transfer assembly may include a first component mounted to the first rail and a second component mounted to the second rail. The first component may wirelessly transmit power to the second component. The second component may be electrically connected to the motor assembly to provide electrical current to the motor assembly.

16 Claims, 8 Drawing Sheets

(51) Int. Cl.
  *B60N 2/06* (2006.01)
  *F16H 19/04* (2006.01)

(56) References Cited

U.S. PATENT DOCUMENTS

| | | | |
|---|---|---|---|
| 978,371 A | 12/1910 | Harrison | |
| 1,192,627 A | 7/1916 | Hatlee | |
| 1,694,031 A | 12/1928 | Braren | |
| 1,770,035 A | 7/1930 | Heap et al. | |
| 2,168,164 A | 8/1939 | Kittredge | |
| 2,170,951 A | 8/1939 | Perry | |
| 2,250,259 A | 7/1941 | Foote, Jr. | |
| 2,475,504 A | 7/1949 | Jackson | |
| 2,508,121 A | 5/1950 | McIver | |
| 2,609,713 A | 9/1952 | Martin | |
| 2,972,910 A | 2/1961 | Menge, Sr. | |
| 2,995,226 A | 8/1961 | Gilder | |
| 3,013,447 A | 12/1961 | Hils et al. | |
| 3,037,400 A | 6/1962 | Sundt | |
| 3,144,791 A | 8/1964 | Menge, Sr. | |
| 3,319,482 A | 5/1967 | Campbell et al. | |
| 3,427,901 A | 2/1969 | Wildhaber | |
| 3,451,290 A | 6/1969 | Wildhaber | |
| 3,965,773 A | 6/1976 | Bert et al. | |
| 4,023,441 A | 5/1977 | Osterwalder | |
| 4,228,698 A | 10/1980 | Winiasz | |
| 4,269,075 A | 5/1981 | Crist et al. | |
| 4,452,102 A | 6/1984 | Shaffer | |
| 4,720,073 A * | 1/1988 | Mann | B60N 2/072 248/419 |
| 4,721,337 A | 1/1988 | Tomita | |
| 4,805,866 A | 2/1989 | Aihara et al. | |
| 4,884,844 A | 12/1989 | Kershaw et al. | |
| 4,930,367 A | 6/1990 | Nagasawa | |
| 4,967,615 A | 11/1990 | Mills | |
| 5,030,184 A | 7/1991 | Rennerfelt | |
| 5,094,420 A * | 3/1992 | Aihara | B60N 2/067 248/419 |
| 5,099,717 A | 3/1992 | Ochiai et al. | |
| 5,222,402 A | 6/1993 | White et al. | |
| 5,259,257 A | 11/1993 | Mouri | |
| 5,314,158 A | 5/1994 | Mouri | |
| 5,349,878 A | 9/1994 | White et al. | |
| 5,425,683 A | 6/1995 | Bang | |
| 5,505,668 A | 4/1996 | Koriakov-Savoysky et al. | |
| 5,598,746 A | 2/1997 | Chen | |
| 5,701,783 A | 12/1997 | Lin | |
| 5,816,555 A | 10/1998 | Ito et al. | |
| 5,865,506 A | 2/1999 | Sakamoto | |
| 6,032,550 A | 3/2000 | Rugh | |
| 6,138,974 A | 10/2000 | Okada et al. | |
| D437,334 S | 2/2001 | Song | |
| 6,220,642 B1 | 4/2001 | Ito et al. | |
| 6,260,672 B1 * | 7/2001 | Frohnhaus | B60N 2/067 248/419 |
| 6,260,922 B1 | 7/2001 | Frohnhaus et al. | |
| 6,261,199 B1 | 7/2001 | Schlangen | |
| 6,322,146 B1 | 11/2001 | Fisher, Jr. | |
| 6,548,332 B2 | 4/2003 | Peng et al. | |
| 6,742,409 B2 | 6/2004 | Blanchard | |
| 6,915,998 B2 | 7/2005 | Borbe et al. | |
| 7,041,024 B2 | 5/2006 | Becker et al. | |
| 7,048,244 B2 | 5/2006 | Hauck | |
| 7,051,986 B1 | 5/2006 | Taubmann et al. | |
| 7,143,513 B2 | 12/2006 | Taubmann et al. | |
| 7,198,243 B2 | 4/2007 | Hofschulte et al. | |
| 7,313,982 B2 | 1/2008 | Wisner et al. | |
| 7,322,257 B2 | 1/2008 | Becker et al. | |
| 7,340,974 B2 | 3/2008 | Landskron et al. | |
| 7,437,962 B2 | 10/2008 | Taubmann et al. | |
| 7,571,666 B2 | 8/2009 | Borbe et al. | |
| 7,703,347 B2 | 4/2010 | Porinsky et al. | |
| 7,887,020 B2 | 2/2011 | Ferguson et al. | |
| 8,061,228 B2 | 11/2011 | Becker et al. | |
| 8,087,974 B2 | 1/2012 | Maeda et al. | |
| 8,113,074 B2 | 2/2012 | Wohrle et al. | |
| 8,128,051 B2 | 3/2012 | Koga et al. | |
| 8,171,823 B2 | 5/2012 | Koga et al. | |
| 8,453,529 B2 | 6/2013 | Birker et al. | |
| 8,485,489 B2 | 7/2013 | Hofschulte et al. | |
| 8,777,794 B2 | 7/2014 | Oishi | |
| 8,826,756 B2 | 9/2014 | Hoffmann et al. | |
| 8,864,231 B2 | 10/2014 | Shimoda et al. | |
| 8,904,895 B2 | 12/2014 | Woehrle et al. | |
| 9,180,795 B2 | 11/2015 | Flieger et al. | |
| 9,205,763 B2 | 12/2015 | Anticuar et al. | |
| 9,415,713 B2 | 8/2016 | Line et al. | |
| 9,689,464 B2 | 6/2017 | Hamakita | |
| 9,694,724 B2 | 7/2017 | Nagata et al. | |
| 9,827,879 B2 * | 11/2017 | Fujita | B60N 2/0881 |
| 9,902,295 B2 | 2/2018 | Napau et al. | |
| 10,021,991 B2 | 7/2018 | Klimm | |
| 10,024,392 B2 | 7/2018 | Napau et al. | |
| 10,195,975 B2 | 2/2019 | Becker et al. | |
| 10,208,835 B2 | 2/2019 | Noguchi et al. | |
| 10,220,730 B2 | 3/2019 | Nagata et al. | |
| 10,220,732 B2 | 3/2019 | Auer et al. | |
| 10,300,812 B2 | 5/2019 | Flieger et al. | |
| 10,486,554 B2 | 11/2019 | Napau et al. | |
| 10,500,984 B2 | 12/2019 | Hoffmann | |
| 10,562,411 B2 | 2/2020 | Higuchi et al. | |
| 10,737,591 B2 | 8/2020 | Ito | |
| 10,843,591 B2 | 11/2020 | Becker et al. | |
| 10,857,910 B2 | 12/2020 | Madhu | |
| 10,933,771 B2 | 3/2021 | Geiges et al. | |
| 10,953,772 B2 | 3/2021 | Napau et al. | |
| 11,180,064 B2 | 11/2021 | Navatte et al. | |
| 11,273,506 B2 | 3/2022 | Napau et al. | |
| 2004/0206195 A1 | 10/2004 | Landskron et al. | |
| 2004/0221670 A1 | 11/2004 | Becker et al. | |
| 2004/0254041 A1 | 12/2004 | Becker et al. | |
| 2005/0082890 A1 | 4/2005 | Taubmann et al. | |
| 2005/0116132 A1 | 6/2005 | Sakamaki | |
| 2005/0126333 A1 | 6/2005 | Dohles et al. | |
| 2005/0146174 A1 | 7/2005 | Maddelein et al. | |
| 2005/0253036 A1 | 11/2005 | Li et al. | |
| 2005/0269478 A1 | 12/2005 | Woehrle et al. | |
| 2006/0084547 A1 | 4/2006 | Dill et al. | |
| 2006/0117885 A1 | 6/2006 | Robson et al. | |
| 2006/0213302 A1 | 9/2006 | Hoffmann et al. | |
| 2006/0249644 A1 | 11/2006 | Folliot et al. | |
| 2007/0029893 A1 | 2/2007 | Schuler et al. | |
| 2007/0108360 A1 | 5/2007 | Ito et al. | |
| 2007/0209857 A1 | 9/2007 | Wolf | |
| 2007/0241602 A1 | 10/2007 | Thiel et al. | |
| 2008/0261743 A1 | 10/2008 | Junkers | |
| 2009/0045661 A1 | 2/2009 | Stoessel et al. | |
| 2010/0139425 A1 | 6/2010 | Schulz et al. | |
| 2010/0237216 A1 | 9/2010 | Napau et al. | |
| 2010/0320352 A1 | 12/2010 | Weber | |
| 2011/0079699 A1 | 4/2011 | Tarusawa et al. | |
| 2011/0308340 A1 | 12/2011 | Bosecker et al. | |
| 2012/0325033 A1 | 12/2012 | Bosecker et al. | |
| 2013/0180348 A1 | 7/2013 | Andres et al. | |
| 2013/0333496 A1 | 12/2013 | Boutouil et al. | |
| 2014/0238188 A1 | 8/2014 | Ito | |
| 2015/0020955 A1 | 1/2015 | Hoffmann et al. | |
| 2015/0210187 A1 | 7/2015 | Harleb et al. | |
| 2015/0283924 A1 | 10/2015 | Boutouil et al. | |
| 2015/0360587 A1 | 12/2015 | Hoffmann et al. | |
| 2016/0257223 A1 | 9/2016 | Markel et al. | |
| 2017/0059017 A1 | 3/2017 | Napau et al. | |
| 2017/0203677 A1 | 7/2017 | Becker et al. | |
| 2018/0065507 A1 | 3/2018 | Napau et al. | |
| 2018/0334054 A1 * | 11/2018 | Higuchi | B60N 2/06 |
| 2019/0152347 A1 | 5/2019 | Becker et al. | |
| 2019/0202322 A1 | 7/2019 | Napau et al. | |
| 2020/0215936 A1 | 7/2020 | Teer et al. | |

(56) References Cited

U.S. PATENT DOCUMENTS

| | | |
|---|---|---|
| 2020/0262317 A1 | 8/2020 | Napau et al. |
| 2021/0016375 A1 | 1/2021 | Napau et al. |

FOREIGN PATENT DOCUMENTS

| | | |
|---|---|---|
| CN | 1251411 A | 4/2000 |
| CN | 1309750 A | 8/2001 |
| CN | 101448674 A | 6/2009 |
| CN | 201350516 Y | 11/2009 |
| CN | 101528502 B | 8/2012 |
| CN | 103095041 A | 5/2013 |
| CN | 103101455 A | 5/2013 |
| CN | 203146709 U | 8/2013 |
| CN | 103498891 A | 1/2014 |
| CN | 204226562 U | 3/2015 |
| CN | 104520140 A | 4/2015 |
| CN | 104802666 A | 7/2015 |
| CN | 204774719 U | 11/2015 |
| CN | 204774722 U | 11/2015 |
| CN | 105270212 A | 1/2016 |
| CN | 105599643 A | 5/2016 |
| CN | 207078030 U | 3/2018 |
| CN | 208306408 U | 1/2019 |
| CN | 208324966 U | 1/2019 |
| DE | 1755740 A1 | 1/1972 |
| DE | 3107455 A1 | 10/1982 |
| DE | 19815283 A1 | 10/1999 |
| DE | 19861100 A1 | 2/2000 |
| DE | 19911432 A1 | 9/2000 |
| DE | 10139631 A1 | 3/2003 |
| DE | 10250994 A1 | 8/2003 |
| DE | 10247204 A1 | 4/2004 |
| DE | 10203983 B4 | 5/2004 |
| DE | 10327103 A1 | 12/2004 |
| DE | 102004013543 A1 | 10/2005 |
| DE | 102005044467 B3 | 3/2007 |
| DE | 202008016335 U1 | 3/2009 |
| DE | 102009006815 A1 | 8/2009 |
| DE | 102013009846 A1 | 12/2013 |
| DE | 10362326 B4 | 2/2014 |
| DE | 102015205440 A1 | 9/2016 |
| DE | 102017100934 A1 | 7/2017 |
| DE | 102017008036 A1 | 3/2018 |
| EP | 0450324 A2 | 10/1991 |
| EP | 0617213 A1 | 9/1994 |
| EP | 0848672 B1 | 12/1999 |
| EP | 0992711 A2 | 4/2000 |
| EP | 1068093 A1 | 1/2001 |
| EP | 1167113 A1 | 1/2002 |
| EP | 1026027 B1 | 3/2004 |
| EP | 1442923 A2 | 8/2004 |
| EP | 1601550 B1 | 10/2012 |
| FR | 679410 A | 4/1930 |
| FR | 2517018 A3 | 5/1983 |
| FR | 2872747 A1 | 1/2006 |
| FR | 2882975 A1 | 9/2006 |
| GB | 2389066 A | 12/2003 |
| GB | 2404704 A | 2/2005 |
| JP | S62184939 A | 8/1987 |
| JP | H08197988 A | 8/1996 |
| JP | 2010112553 A | 5/2010 |
| JP | 2015134513 A | 7/2015 |
| JP | 2018203208 A | 12/2018 |
| KR | 20090071616 A | 7/2009 |
| KR | 101470180 B1 | 12/2014 |
| KR | 101501384 B1 | 3/2015 |
| KR | 101518647 B1 | 5/2015 |
| KR | 101708126 B1 | 2/2017 |
| WO | WO-8606036 A1 | 10/1986 |
| WO | WO-9709192 A1 | 3/1997 |
| WO | WO-03074209 A2 | 9/2003 |
| WO | WO-2009092946 A2 | 7/2009 |
| WO | WO-2010116125 A1 | 10/2010 |
| WO | WO-2011098161 A1 | 8/2011 |
| WO | WO-2011137989 A1 | 11/2011 |
| WO | WO-2012150050 A1 | 11/2012 |
| WO | WO-2013010888 A2 | 1/2013 |
| WO | WO-2015161714 A1 | 10/2015 |
| WO | WO-2018221977 A1 | 12/2018 |

OTHER PUBLICATIONS

Office Action regarding Korean Patent Application No. 10-2019-7026939, dated Feb. 19, 2021. Translation provided by KORYO IP & Law.

Office Action for U.S. Appl. No. 17/062,931, dated Sep. 9, 2021.

Office Action regarding German Patent Application No. 112019000026.8, dated Sep. 25, 2020. Partial translation provided by Bardehle Pagenberg Partnerschaft mbB.

Office Action regarding Chinese Patent Application No. 202010075280.8 dated Nov. 26, 2021.

International Search Report regarding International Application No. PCT/US2016/048649, dated Nov. 28, 2016.

Written Opinion of the International Searching Authority regarding International Application No. PCT/US2016/048649, dated Nov. 28, 2016.

International Search Report regarding International Application No. PCT/US2016/048634, dated Dec. 21, 2016.

Written Opinion of the International Searching Authority regarding International Application No. PCT/US2016/048634, dated Dec. 21, 2016.

International Search Report regarding International Application No. PCT/US2019/021870, dated Jun. 25, 2019.

Written Opinion of the International Searching Authority regarding International Application No. PCT/US2019/021870, dated Jun. 25, 2019.

Dicker Jr. et al., "Worms and Worm Gears." Theory of Machines and Mechanisms, 3rd ed., Oxford University Press, 2003, pp. 306-310.

International Search Report regarding International Application No. PCT/US2020/012857, dated Apr. 29, 2020.

Written Opinion of the International Searching Authority regarding International Application No. PCT/US2020/012857, dated Apr. 29, 2020.

Office Action regarding German Patent Application No. 102020200205.3, dated Aug. 20, 2020. Partial translation provided by Bardehle Pagenberg Partnerschaft mbB.

Office Action regarding German Patent Application No. 102017008036.4, dated Apr. 5, 2018.

Office Action regarding Korean Patent Application No. 10-2017-0114314, dated Sep. 28, 2018.

Office Action regarding Korean Patent Application No. 10-2017-0114314, dated Mar. 27, 2019.

Office Action regarding Chinese Patent Application No. 201710791607.X, dated Aug. 5, 2019.

Office Action regarding Korean Patent Application No. 10-2017-0114314, dated Sep. 9, 2019.

Office Action regarding Chinese Patent Application No. 201710791607.X, dated Apr. 21, 2020.

Office Action regarding German Patent Application No. 102017008036.4, dated Jul. 17, 2020.

Office Action regarding Chinese Patent Application No. 201710791607.X, dated Dec. 22, 2020.

Office Action regarding Chinese Patent Application No. 202010104705.3 dated Feb. 7, 2022.

Notice of Allowance regarding U.S. Appl. No. 17/236,639 dated Apr. 18, 2022.

Office Action regarding German Patent Application No. 1020170080364, dated May 24, 2022.

Office Action regarding Chinese Patent Application No. 2020101047053, dated Jul. 14, 2022.

Office Action regarding German Patent Application No. 1020202002053, dated Sep. 8, 2022.

Non-Final Office Action regarding U.S. Appl. No. 16/787,420 dated Oct. 6, 2022.

* cited by examiner

POWER SEAT TRACK ASSEMBLY

CROSS-REFERENCE TO RELATED APPLICATIONS

This application claims the benefit of U.S. Provisional Application No. 62/790,245, filed on Jan. 9, 2019. The entire disclosure of the above application is incorporated herein by reference.

FIELD

The present disclosure relates to a power seat track assembly for a vehicle seat assembly.

SUMMARY

This section provides a general summary of the disclosure, and is not a comprehensive disclosure of its full scope or all of its features.

In one form, the present disclosure provides a vehicle seat assembly that may include a vehicle seat and a power seat track assembly. The power seat track assembly may include an elongated first rail, a second rail, a motor assembly, and a power-transfer assembly. The first rail may be mounted to a vehicle cabin floor. The second rail may engage the first rail and may be movable along a length of the first rail. The motor assembly may be mounted to the second rail and is operable to drive the second rail along the length of the first rail. The power-transfer assembly may include a first component mounted to the first rail and a second component mounted to the second rail. The first component may wirelessly transmits power to the second component. The second component is electrically connected to the motor assembly to provide electrical current to the motor assembly.

In some configurations of the vehicle seat assembly of the above paragraph, the first rail, the motor assembly, the power-transfer assembly, and a portion of the second rail are mounted below the vehicle cabin floor.

In some configurations of the vehicle seat assembly of any of the above paragraphs, the second rail includes a bracket portion that extends through an opening in the vehicle cabin floor.

In some configurations, the vehicle seat assembly of any of the above paragraphs includes an additional second rail and an additional motor assembly mounted to the additional second rail. The power-transfer assembly may include an additional second component mounted to the additional second rail and electrically connected to the additional motor assembly. The motor assemblies may be operable to independently drive the second rails along the length of the first rail.

In some configurations of the vehicle seat assembly of any of the above paragraphs, the first component is an elongated power-transfer rail, and the second components are power-transfer blocks.

In some configurations of the vehicle seat assembly of any of the above paragraphs, the first rail is fixed relative to the vehicle cabin floor, and the second rails support vehicle seats for movement relative to the first rail and the vehicle cabin floor.

In some configurations of the vehicle seat assembly of any of the above paragraphs, the motor assembly includes a pinion that is rotatable about a rotational axis. A rack may be fixed to the first rail and includes a plurality of teeth that meshingly engage the pinion.

In some configurations of the vehicle seat assembly of any of the above paragraphs, the rack includes a first aperture, and the first rail includes a second aperture. A fastener may extend through the first and second apertures and into a third aperture in the vehicle cabin floor.

In some configurations of the vehicle seat assembly of any of the above paragraphs, the teeth of the rack are formed on a lateral surface of the rack. The rotational axis of the pinion may be parallel to a longitudinal axis of the fastener.

In some configurations of the vehicle seat assembly of any of the above paragraphs, the rotational axis of the pinion is perpendicular to the vehicle cabin floor and is perpendicular to a direction in which the second rail is movable relative to the first rail.

In another form, the present disclosure provides a power seat track assembly that may include an elongated first rail, a second rail, a motor assembly, and a power-transfer assembly. The second rail may engage the first rail and may be movable along a length of the first rail. The motor assembly may be mounted to the second rail and may be operable to drive the second rail along the length of the first rail. The power-transfer assembly may include a first component mounted to the first rail and a second component mounted to the second rail. The first component may wirelessly transmit power to the second component. The second component may be electrically connected to the motor assembly to provide electrical current to the motor assembly.

In some configurations of the power seat track assembly of the above paragraph, the first rail, the motor assembly, the power-transfer assembly, and a portion of the second rail are mounted below a cabin floor of a vehicle.

In some configurations of the power seat track assembly of any of the above paragraphs, the second rail includes a bracket portion that extends through an elongated opening in the cabin floor.

In some configurations, the power seat track assembly of any of the above paragraphs may also include an additional second rail and an additional motor assembly mounted to the additional second rail.

In some configurations of the power seat track assembly of any of the above paragraphs, the power-transfer assembly may include an additional second component mounted to the additional second rail and electrically connected to the additional motor assembly.

In some configurations of the power seat track assembly of any of the above paragraphs, the motor assemblies may be operable to independently drive the second rails along the length of the first rail.

In some configurations of the power seat track assembly of any of the above paragraphs, the first component is an elongated power-transfer rail.

In some configurations of the power seat track assembly of any of the above paragraphs, the second components are power-transfer blocks.

In some configurations of the power seat track assembly of any of the above paragraphs, the first rail is fixed relative to the cabin floor, and the second rails support vehicle seats for movement relative to the first rail and the cabin floor.

In some configurations of the power seat track assembly of any of the above paragraphs, the motor assembly includes a pinion that is rotatable about a rotational axis, and a rack is fixed to the first rail and includes a plurality of teeth that meshingly engage the pinion.

In some configurations of the power seat track assembly of any of the above paragraphs, the rack includes a first aperture, and the first rail includes a second aperture. A fastener may extend through the first and second apertures and into a third aperture in the vehicle cabin floor.

In some configurations of the power seat track assembly of any of the above paragraphs, the teeth of the rack are formed on a lateral surface of the rack. The rotational axis of the pinion may be parallel to a longitudinal axis of the fastener.

In some configurations of the power seat track assembly of any of the above paragraphs, the rotational axis of the pinion is perpendicular to the vehicle cabin floor and is perpendicular to a direction in which the second rail is movable relative to the first rail.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
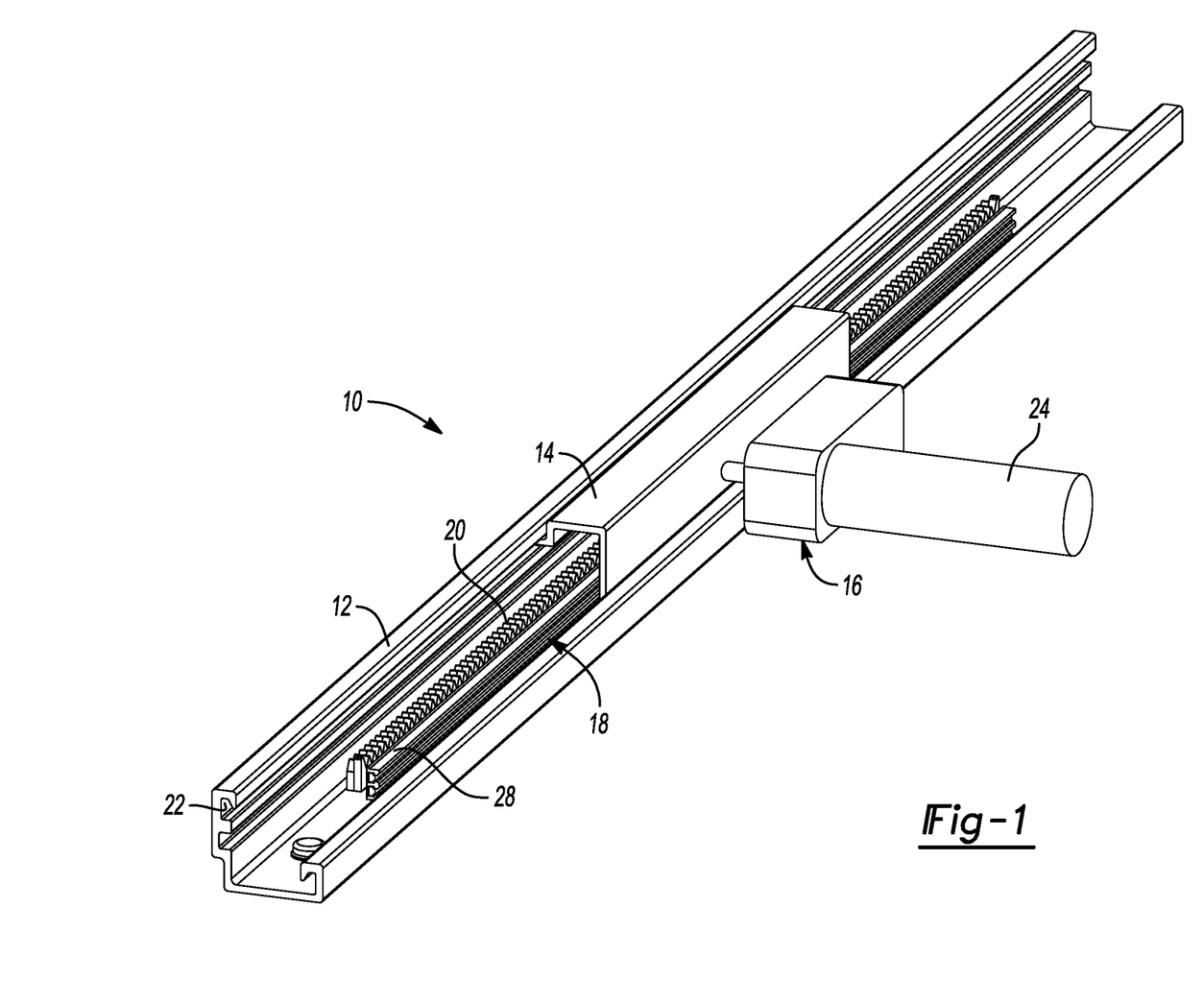
FIG. 1 is a perspective view of a power seat track assembly for a vehicle seat assembly.
Figure 2:
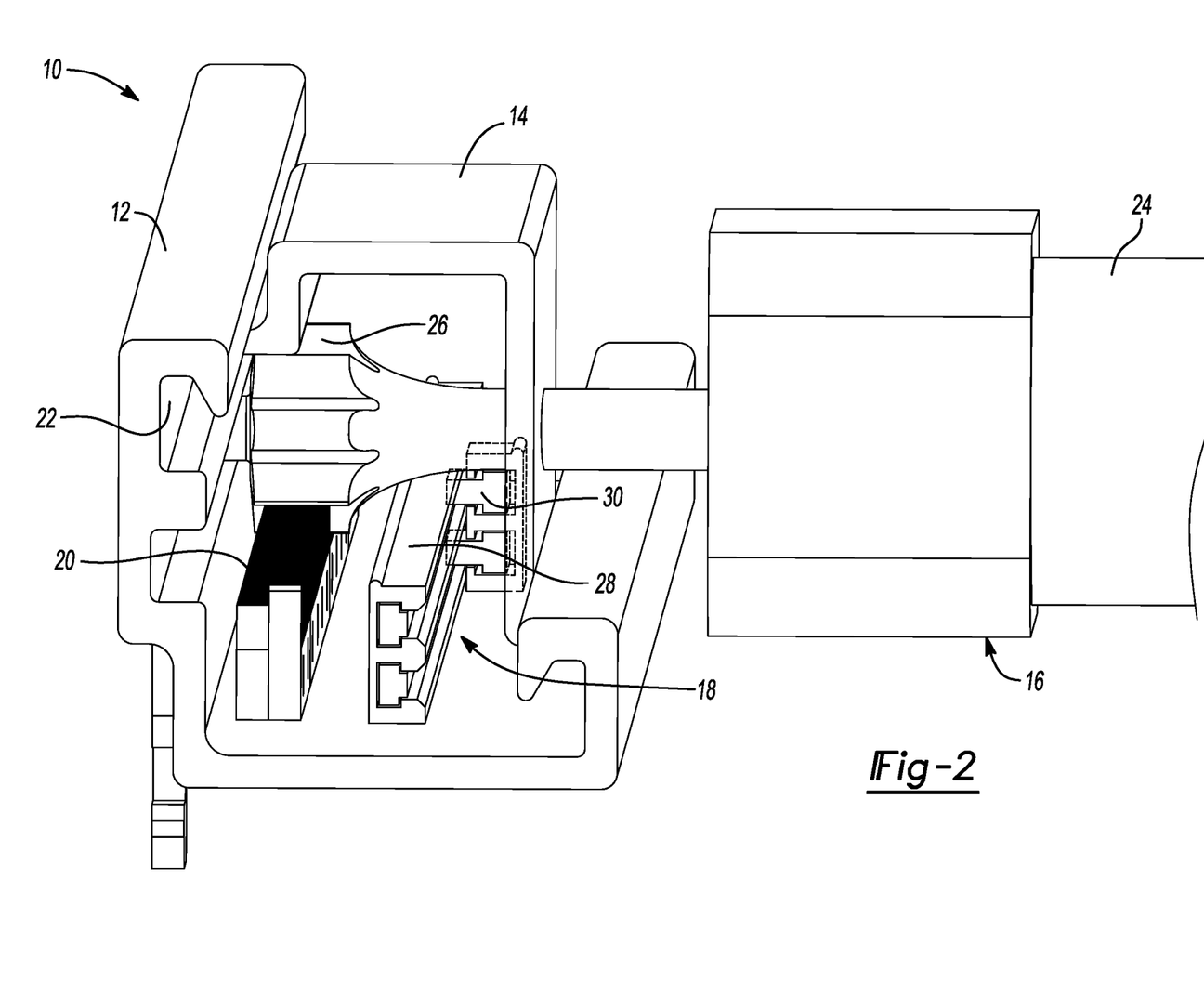
FIG. 2 is another perspective view of the power seat track assembly of FIG. 1.

With reference to FIGS. 1 and 2, a power seat track assembly 10 is provided that may include a first rail 12, a second rail 14, a motor assembly 16, and a power-transfer assembly 18 (only partially shown in FIGS. 1 and 2). A pair (or multiple pairs) of the power seat track assemblies 10 (only one power seat track assembly 10 is shown in the figures) may be installed in or on a cabin floor of vehicle (e.g., an autonomous automotive vehicle or a human-driven automotive vehicle) and may support one or more vehicle seats (not shown). The power seat track assemblies 10 are operable to selectively move the one or more vehicle seats relative to the cabin floor (e.g., in fore-aft directions).

The first rail 12 may be an elongated, extruded rail and may be fixed relative to the cabin floor (e.g., fixedly mounted above or below the cabin floor). A rack 20 having a plurality of rack teeth may be attached to or formed on the first rail 12. A cross-sectional shape of the first rail 12 defines a channel 22 that movably receives a portion of the second rail 14. That is, a portion of the second rail 14 includes a cross-sectional shape that fits within the channel 22 to allow the second rail 14 to move (e.g., slide) along the length of the first rail 12. A vehicle seat may be mounted to the second rail 14 (i.e., the vehicle seat may be mounted to the second rail 14 of each power seat track assembly 10 of a pair of power seat track assemblies 10).

The motor assembly 16 may be mounted to the second rail 14 and may include a motor 24 and a pinion 26 (FIG. 2). The pinion 26 may be meshingly engaged with the rack 20. The motor 24 may drive rotation of the pinion 26 relative to the rack 20 to move the second rail 14 along the length of the first rail 12.

The power-transfer assembly 18 can be any suitable type of wireless power-transfer assembly such as an inductive power transfer assembly, for example. The power-transfer assembly 18 may include an elongated power-transfer rail 28 and a power-transfer block 30. The power-transfer rail 28 may be fixed to the first rail 12 and may extend along much of (or the entire) length of the first rail 12. The power-transfer block 30 may be mounted to the second rail 14 and may move with the second rail 14 relative to the power-transfer rail 28 and the first rail 12 during operation of the motor assembly 16. The power-transfer rail 28 may be connected via wires to a source of electrical power (e.g., a battery). Power may be wirelessly transferred from the power-transfer rail 28 to the power-transfer block 30 (via induction, for example) even while the power-transfer block 30 moves along the length of the power-transfer rail 28. The power-transfer block 30 may be connected via wires to the motor 24 to provide electrical current to the motor 24.

In some configurations, a pair of power seat track assemblies 10 may movably support multiple vehicle seats (e.g., a front row seat, a second row seat, a third row seat, etc.). That is, each power seat track assembly 10 may include more than one second rail 14 engaging a single first rail 12. Each second rail 14 may be independently driven by a respective motor assembly 16 and can support a respective vehicle seat. In this manner, multiple vehicle seats can be independent moved along a single first rail 12 (or a single pair of first rails 12). Each second rail 14 may also include a respective power-transfer block 30 that is movable along the power-transfer rail 28. Each power-transfer block 30 can independently receive power from the power-transfer rail 28. This significantly reduces length of wire harnesses powering the motor assemblies 16.

Figure 3:
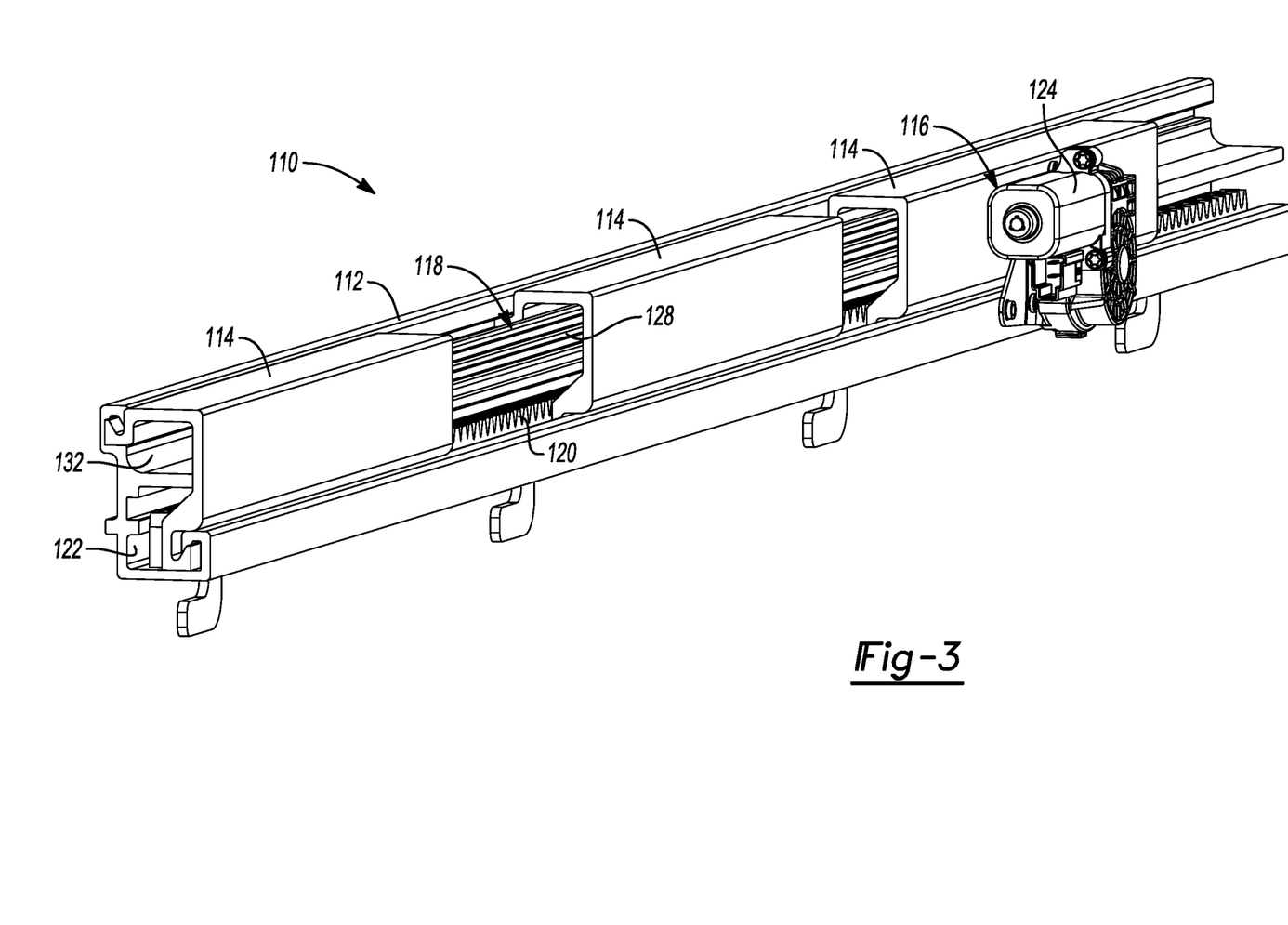
FIG. 3 is a perspective view of another power seat track assembly for a vehicle seat assembly.
Figure 4:
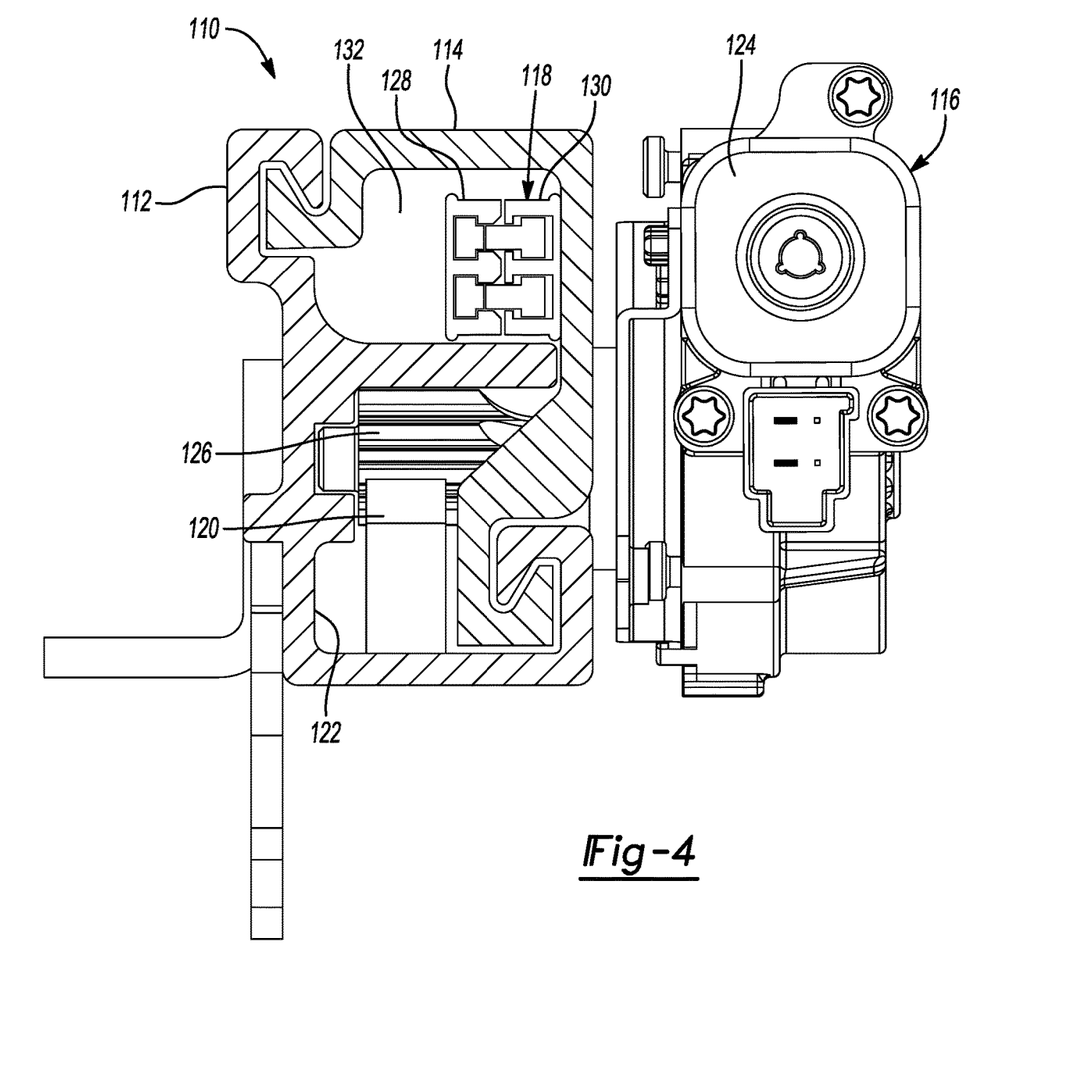
FIG. 4 is a cross-sectional view of the power seat track assembly of FIG. 3.

With reference to FIGS. 3 and 4, another power seat track assembly 110 is provided that may include a first rail 112, a plurality of second rails 114, a plurality of motor assemblies 116 (only one of which is shown), and a power-transfer assembly 118. As described above with respect to the power seat track assembly 10, a pair (or multiple pairs) of the power seat track assemblies 110 (only one power seat track assembly 110 is shown in the figures) may be installed in or on a cabin floor of vehicle (e.g., an autonomous automotive vehicle or a human-driven automotive vehicle) and may support a plurality of vehicle seats (not shown). The power seat track assemblies 110 are operable to independently move the vehicle seats relative to the cabin floor (e.g., in fore-aft directions).

The first rail 112 and the second rails 114 can be generally similar to the first rail 12 and second rail 14 described above. That is, the first rail 112 may be an elongated, extruded rail and may be fixed relative to the cabin floor (e.g., fixedly mounted above or below the cabin floor). A rack 120 having a plurality of rack teeth may be attached to or formed on the first rail 112. A cross-sectional shape of the first rail 112 defines a channel 122 that movably receives a portion of each of the second rails 114. That is, a portion of each of the second rails 114 includes a cross-sectional shape that fits within the channel 122 to allow the second rails 114 to move (e.g., slide or move along bearings) along the length of the first rail 112. A vehicle seat may be mounted to each of the second rails 114 (i.e., each vehicle seat may be mounted to a respective one of the second rails 114 of each power seat track assembly 110 of a pair of power seat track assemblies 110).

Each of the motor assemblies 116 may be mounted to a respective one of the second rails 114 and each may include a motor 124 and a pinion 126 (FIG. 4). The pinion 126 of all of the motor assemblies 116 may be meshingly engaged with the rack 120. Each motor 124 may drive rotation of the respective pinion 126 relative to the rack 120 to move the respective second rail 114 along the length of the first rail 112.

The power-transfer assembly 118 can be any suitable type of wireless power-transfer assembly such as an inductive power transfer assembly, for example. The power-transfer assembly 118 may include an elongated power-transfer rail 128 and a plurality of power-transfer blocks 130. The power-transfer rail 128 may be fixed to the first rail 112 and may extend along much of (or the entire) length of the first rail 112. Each of the power-transfer blocks 130 may be mounted to a respective one of the second rails 114 and may move with the respective second rail 114 relative to the power-transfer rail 128 and the first rail 112 during operation of the respective motor assembly 116. The power-transfer rail 128 may be connected via wires to a source of electrical power (e.g., a battery). Power may be wirelessly transferred from the power-transfer rail 128 to the power-transfer blocks 130 (via induction, for example) even while the power-transfer blocks 130 move along the length of the power-transfer rail 128. Each of the power-transfer blocks 130 may be connected via wires to the respective motor 124 to provide electrical current to the motor 124. Like the power-transfer assembly 18, the power-transfer assembly 118 may be disposed in a space 132 between the first rail 112 and the second rails 114.

Figure 5:
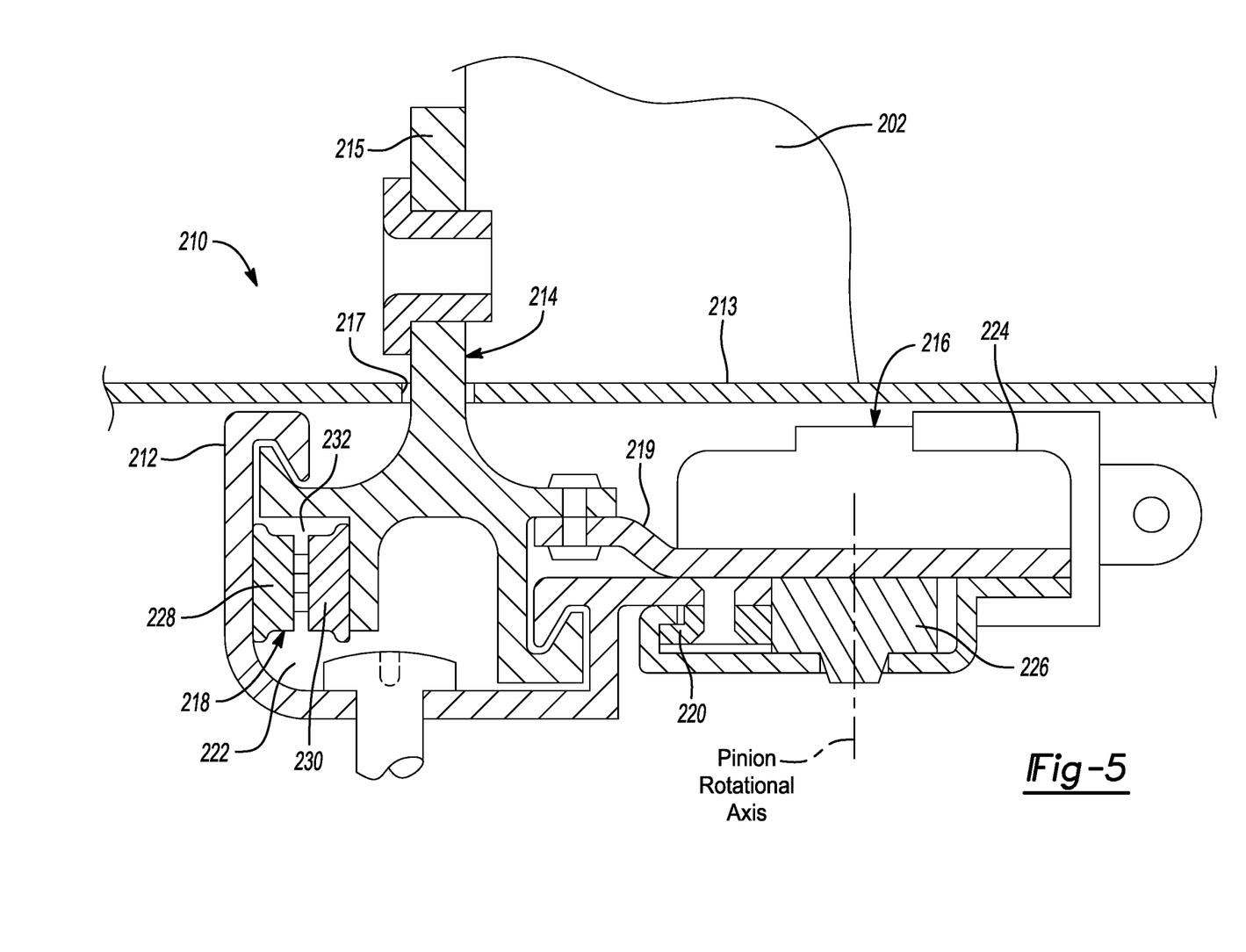
FIG. 5 is a cross-sectional view of another power seat track assembly for a vehicle seat assembly.

With reference to FIG. 5, another power seat track assembly 210 is provided that may include a first rail 212, one or more second rails 214, one or more motor assemblies 216 (only one of which is shown), and a power-transfer assembly 218. As described above with respect to the power seat track assembly 10, 110, a pair (or multiple pairs) of the power seat track assemblies 210 (only one power seat track assembly 210 is shown in FIG. 5) may be installed in or on a cabin floor of vehicle (e.g., an autonomous automotive vehicle or a human-driven automotive vehicle) and may support a plurality of vehicle seats 202 (shown schematically). The power seat track assemblies 210 are operable to independently move the vehicle seats relative to the cabin floor (e.g., in fore-aft directions).

The first rail 212 may be an elongated, extruded rail and may be fixedly mounted below a cabin floor 213 of the vehicle. A rack 220 having a plurality of rack teeth may be attached to or formed on the first rail 212. A cross-sectional shape of the first rail 212 defines a channel 222 that movably receives a portion of each of the second rails 214. That is, a portion of each of the second rails 214 includes a cross-sectional shape that fits within the channel 222 to allow the second rails 214 to move (e.g., slide or move along bearings) along the length of the first rail 212. Each of the second rails 214 may also include a blade or bracket portion 215 that extends upward through an elongated slot or opening 217 in the cabin floor 213. A vehicle seat may be mounted to the bracket portion 215 (i.e., each vehicle seat may be mounted to the bracket portion 215 of a respective one of the second rails 214 of each power seat track assembly 210 of a pair of power seat track assemblies 210). As shown in FIG. 5, the bracket portion 215 may be the only part of the power seat track assembly 210 that is disposed above the cabin floor 213. That is, the first rail 212, a portion of the second rails 214, the motor assemblies 216, and the power-transfer assemblies 218 may be disposed beneath the cabin floor 213.

Each of the motor assemblies 216 may be mounted to a respective one of the second rails 214 (e.g., via motor bracket 219) and each may include a motor 224 and a pinion 226. The pinion 226 of all of the motor assemblies 216 may be meshingly engaged with the rack 220. Each motor 224 may drive rotation of the respective pinion 226 relative to the rack 220 to move the respective second rail 214 along the length of the first rail 212. The horizontal orientation of the motor assemblies 216 (i.e., the pinion 226 being horizontally adjacent the rack 220 rather than vertically above the rack 220) reduces the thickness of the power seat track assembly 210 to allow all of the power seat track assembly 210 (except for the bracket portion 215 to be disposed below the cabin floor 213.

The power-transfer assembly 218 can be any suitable type of wireless power-transfer assembly such as an inductive power transfer assembly, for example. The power-transfer assembly 218 may include an elongated power-transfer rail 228 and a plurality of power-transfer blocks 230. The power-transfer rail 228 may be fixed to the first rail 212 and may extend along much of (or the entire) length of the first rail 212. Each of the power-transfer blocks 230 may be mounted to a respective one of the second rails 214 and may move with the respective second rail 214 relative to the power-transfer rail 228 and the first rail 212 during operation of the respective motor assembly 216. The power-transfer rail 228 may be connected via wires to a source of electrical power (e.g., a battery). Power may be wirelessly transferred from the power-transfer rail 228 to the power-transfer blocks 230 (via induction, for example) even while the power-transfer blocks 230 move along the length of the power-transfer rail 228. Each of the power-transfer blocks 230 may be connected via wires to the respective motor 224 to provide electrical current to the motor 224. Like the power-transfer assembly 18, 118, the power-transfer assembly 218 may be disposed in a space 232 between the first rail 212 and the second rails 214.

Figure 6:
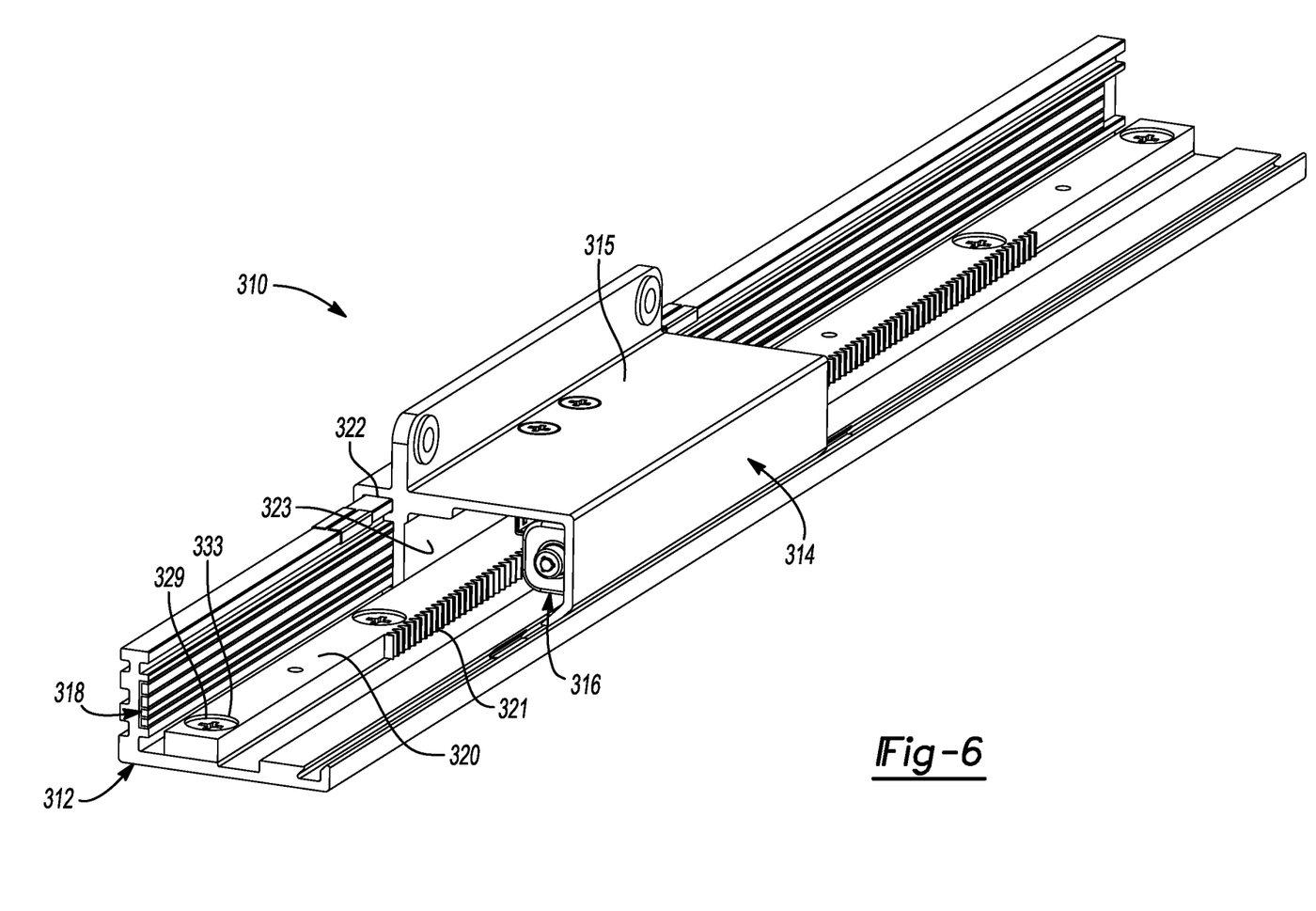
FIG. 6 is a partial perspective view of another power seat track assembly for a vehicle seat assembly.
Figure 7:
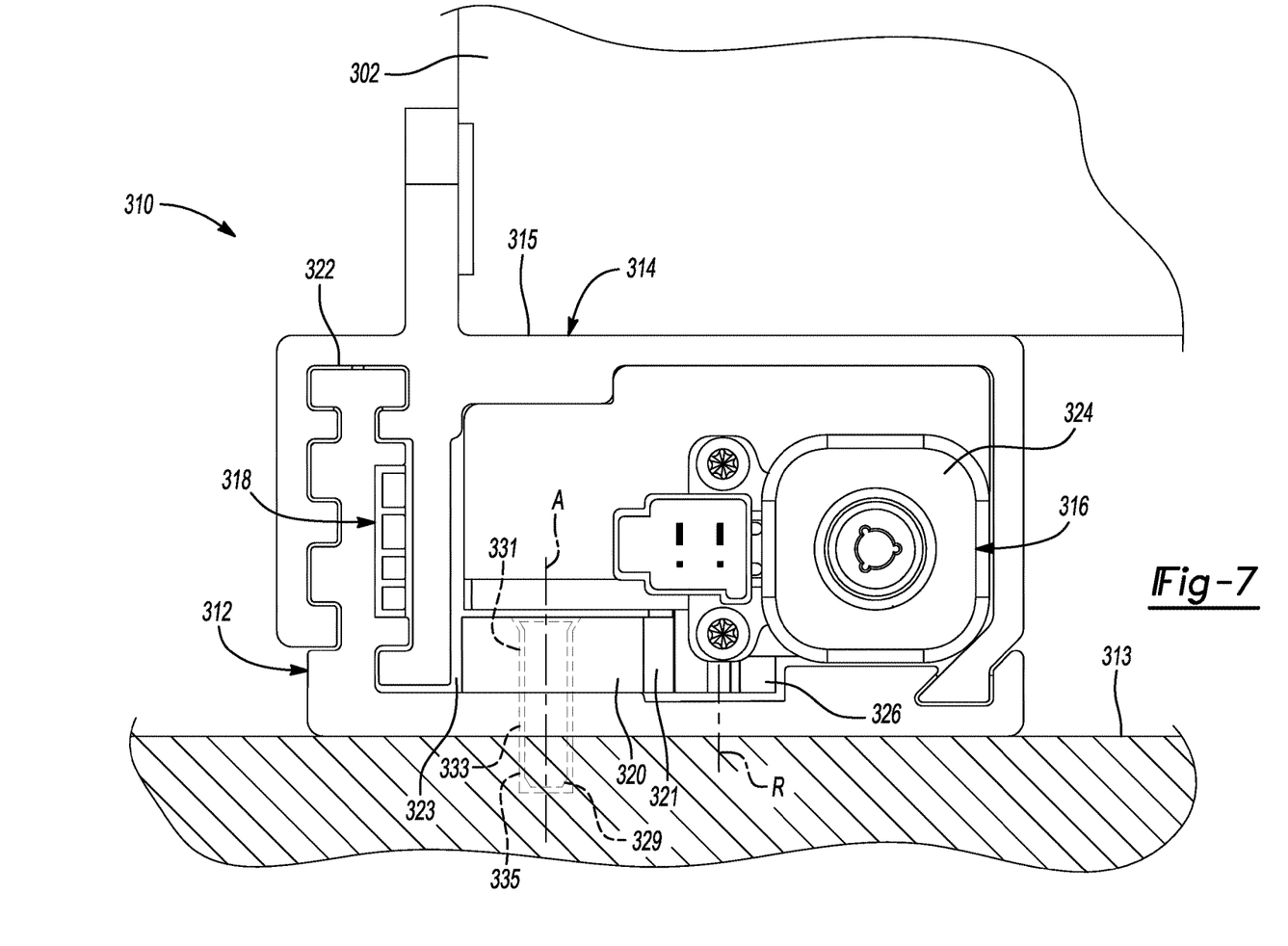
FIG. 7 is a side view of the power seat track assembly of FIG. 6.
Figure 8:
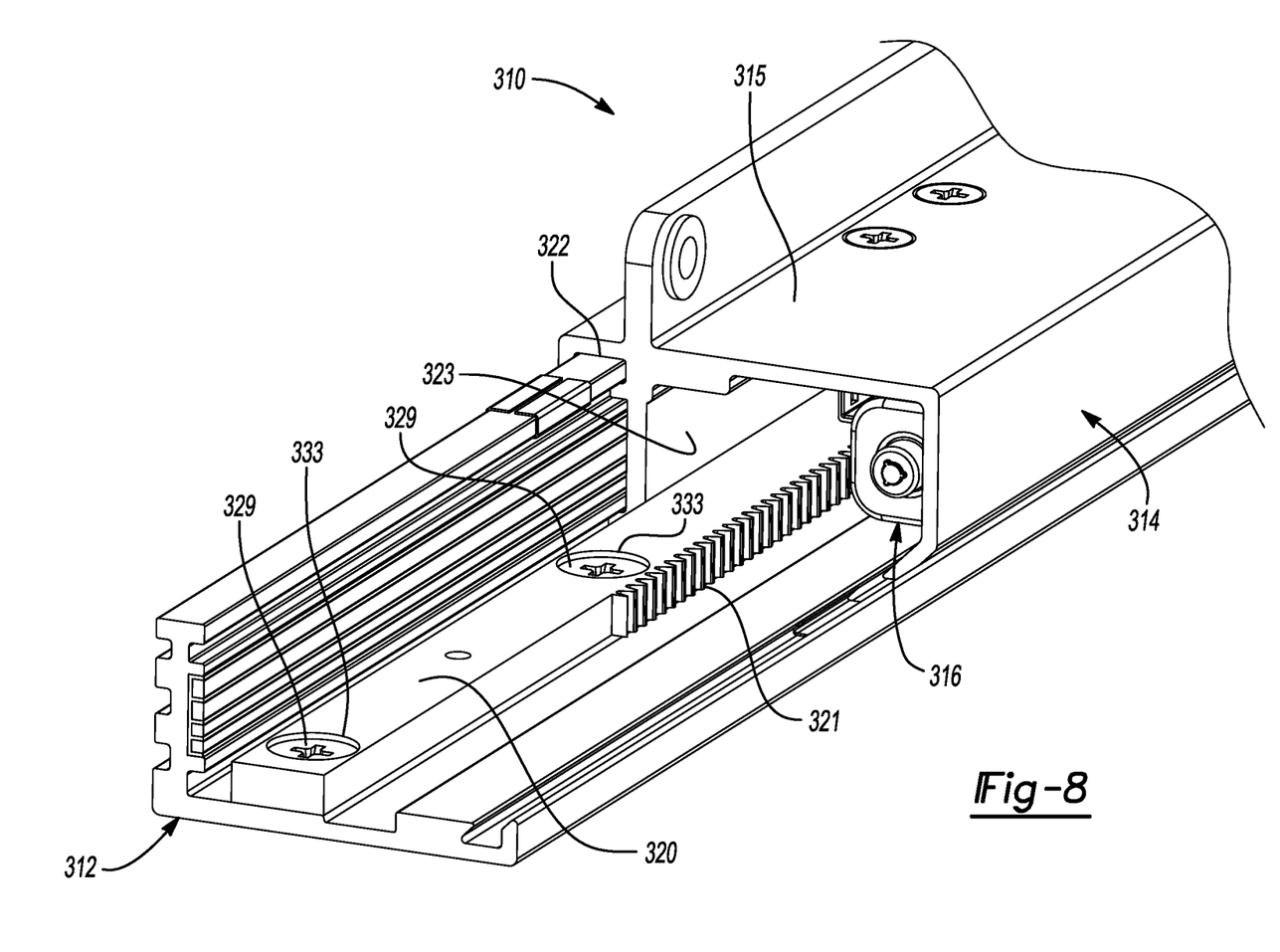
FIG. 8 is another partial perspective view of the power seat track assembly of FIG. 6.

With reference to FIGS. 6-8, another power seat track assembly 310 is provided that may include a first rail 312, one or more second rails 314, one or more motor assemblies 316 (only one of which is shown), and a power-transfer assembly 318 (e.g., similar or identical to the power-transfer assemblies 18, 118, 218). As described above with respect to the power seat track assembly 10, 110, 210, a pair (or multiple pairs) of the power seat track assemblies 310 may be installed on a cabin floor 313 of vehicle (e.g., an autonomous automotive vehicle or a human-driven automotive vehicle) and may support a one or more vehicle seats 302 (shown schematically). The power seat track assemblies 310 are operable to independently move the vehicle seat(s) relative to the cabin floor 313 (e.g., in fore-aft directions).

The first rail 312 may be an elongated, extruded rail and may be fixedly mounted to the cabin floor 313 (FIG. 7) of the vehicle. A rack 320 having a plurality of rack teeth 321 may be attached to or formed on the first rail 312. A cross-sectional shape of the first rail 312 may define a first channel 322 and a second channel 323 that movably receive portions of each of the second rails 314. That is, portions of each of the second rails 314 include cross-sectional shapes that fits within the first and second channels 322, 323 to allow the second rails 314 to move (e.g., slide or move along bearings) along the length of the first rail 312. Each of the second rails 314 may also include a bracket portion 315 to which a vehicle seat may be mounted.

The motor assembly 316 may be mounted to the second rail 314 and disposed within the second channel 323. The motor assembly 316 may include a motor 324 and a pinion 326 (FIG. 7). The pinion 326 may be meshingly engaged with the rack 320. The motor 324 may drive rotation of the respective pinion 326 about a rotational axis R relative to the rack 320 to move the second rail 314 along the length of the first rail 312. The rack 320 may be oriented horizontally such that the teeth 321 extend horizontally outward from a lateral surface of the rack 320 so that the pinion 326 is horizontally adjacent the rack 320 (rather than vertically above the rack 320). The rotational axis R of the pinion 326 extends in a vertical direction (e.g., perpendicular to the cabin floor 313 and perpendicular to the direction in which the second rail 314 moves relative to the first rail 312). This orientation of the rack 320 and the pinion 326 allow fasteners 329 (e.g., threaded fasteners or rivets) to extend through the rack 320 and the first rail 312 and extend into the cabin floor 313 to secure the power seat track assembly 310 to the cabin floor 313. As shown in FIG. 7, the fasteners 329 extend through respective apertures 331 in the rack 320 and apertures 333 in the first rail 312 and into apertures 335 in the cabin floor 313. A longitudinal axis A of the fastener 329 may be parallel to the rotational axis R of the pinion 326 (i.e., in a direction perpendicular to the cabin floor 313 and perpendicular to the direction in which the second rail 314 moves relative to the first rail 312).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle seat assembly comprising:
a vehicle seat;
an elongated first rail mounted to a vehicle cabin floor;
a second rail engaging the first rail and movable along a length of the first rail;
a motor assembly mounted to the second rail and operable to drive the second rail along the length of the first rail; and
a power-transfer assembly including a first component mounted to the first rail and a second component mounted to the second rail, wherein the first component wirelessly transmits power to the second component, and wherein the second component is electrically connected to the motor assembly to provide electrical current to the motor assembly,
wherein the first rail is fixed relative to the vehicle cabin floor, and wherein the second rail supports the vehicle seat for movement relative to the first rail and the vehicle cabin floor, wherein the motor assembly includes a pinion that is rotatable about a rotational axis, and wherein a rack is fixed to the first rail and includes a plurality of teeth that meshingly engage the pinion, wherein the rack includes a first aperture, wherein the first rail includes a second aperture, and wherein a fastener extends through the first and second apertures and into a third aperture in the vehicle cabin floor, and wherein the teeth of the rack are formed on a lateral surface of the rack, and wherein the rotational axis of the pinion is parallel to a longitudinal axis of the fastener.

2. The vehicle seat assembly of claim 1, wherein the first rail, the motor assembly, the power-transfer assembly, and a portion of the second rail are mounted below the vehicle cabin floor.

3. The vehicle seat assembly of claim 2, wherein the second rail includes a bracket portion that extends through an opening in the vehicle cabin floor.

4. The vehicle seat assembly of claim 1, further comprising an additional second rail and an additional motor assembly mounted to the additional second rail, wherein the power-transfer assembly includes an additional second component mounted to the additional second rail and electrically connected to the additional motor assembly, and wherein the motor assemblies are operable to independently drive the second rails along the length of the first rail.

5. The vehicle seat assembly of claim 1, wherein the first component is an elongated power-transfer rail, and wherein the second component is a power-transfer block.

6. The vehicle seat assembly of claim 1, wherein the rotational axis of the pinion is perpendicular to the vehicle cabin floor and is perpendicular to a direction in which the second rail is movable relative to the first rail.

7. A power seat track assembly comprising:
an elongated first rail;
a second rail engaging the first rail and movable along a length of the first rail;
a motor assembly mounted to the second rail and operable to drive the second rail along the length of the first rail; and
a power-transfer assembly including a first component mounted to the first rail and a second component mounted to the second rail, wherein the first component wirelessly transmits power to the second component, and wherein the second component is electrically connected to the motor assembly to provide electrical current to the motor assembly, wherein the first rail is fixed relative to a vehicle cabin floor, and wherein the second rail supports a vehicle seat for movement relative to the first rail and the vehicle cabin floor, wherein the motor assembly includes a pinion that is rotatable about a rotational axis, and wherein a rack is fixed to the first rail and includes a plurality of teeth that meshingly engage the pinion, wherein the rack includes a first aperture, wherein the first rail includes a second aperture, and wherein a fastener extends through the first and second apertures and into a third aperture in the vehicle cabin floor, and wherein the teeth of the rack are formed on a lateral surface of the rack, and wherein the rotational axis of the pinion is parallel to a longitudinal axis of the fastener.

8. The power seat track assembly of claim 7, wherein the first rail, the motor assembly, the power-transfer assembly, and a portion of the second rail are mounted below a vehicle cabin floor.

9. The power seat track assembly of claim 8, wherein the second rail includes a bracket portion that extends through an opening in the vehicle cabin floor.

10. The power seat track assembly of claim 7, further comprising an additional second rail and an additional motor assembly mounted to the additional second rail, wherein the power-transfer assembly includes an additional second component mounted to the additional second rail and electrically connected to the additional motor assembly, and wherein the motor assemblies are operable to independently drive the second rails along the length of the first rail.

11. The power seat track assembly of claim 7, wherein the first component is an elongated power-transfer rail, and wherein the second component is a power-transfer block.

12. The power seat track assembly of claim 7, wherein the rotational axis of the pinion is perpendicular to the vehicle cabin floor and is perpendicular to a direction in which the second rail is movable relative to the first rail.

13. A vehicle seat assembly comprising:
a vehicle seat;
an elongated first rail mounted to a vehicle cabin floor;
a second rail engaging the first rail and movable along a length of the first rail;
a motor assembly mounted to the second rail and operable to drive the second rail along the length of the first rail; and
a power-transfer assembly including a first component mounted to the first rail and a second component mounted to the second rail, wherein the first component wirelessly transmits power to the second component, and wherein the second component is electrically connected to the motor assembly to provide electrical current to the motor assembly, wherein the first rail is fixed relative to the vehicle cabin floor, and wherein the second rail supports the vehicle seat for movement relative to the first rail and the vehicle cabin floor, wherein the motor assembly includes a pinion that is rotatable about a rotational axis, and wherein a rack is fixed to the first rail and includes a plurality of teeth that meshingly engage the pinion, and wherein the rack is disposed on a surface of the first rail, wherein the teeth of the rack are arranged in a linear pattern that extends along a length of the first rail and parallel to a direction in which the first component of the power-transfer assembly extends.

14. The power seat track assembly of claim 13, wherein the first rail, the motor assembly, the power-transfer assembly, and a portion of the second rail are mounted below a vehicle cabin floor.

15. The power seat track assembly of claim 13, wherein the first component is an elongated power-transfer rail, and wherein the second component is a power-transfer block.

16. The power seat track assembly of claim 13, wherein the first rail has an L-shaped profile.

* * * * *